3,088,836
Patented May 7, 1963

3,088,836
TREATMENT OF SAWDUST AND SIMILAR PARTICLES, ESPECIALLY FOR USE AS A BASE LAYER
Moïse Garti and Pierre Louis Buchet, Paris, France; said Buchet assignor to Centre Technique du Bois, Paris, Seine, France, a French organization
No Drawing. Filed June 21, 1960, Ser. No. 37,597
Claims priority, application France June 23, 1959
4 Claims. (Cl. 106—202)

This invention relates to the treatment of sawdust and/or wood particles especially with a view to the production of a material suitable for use as a base layer for the coating of ground surfaces.

A number of processes are known in which sawdust and wood particles are agglomerated with various substances, sometimes in the presence of water, to provide wood agglomerates.

In certain applications however, and especially for the formation of base layers for ground surface coating, it would be desirable to retain in the finished product the pulverulent and yielding character of sawdust while imparting thereto the desired rot-proof character, and imperviousness to destructive agents such humidity and fungi.

It is a general object of this invention to provide a method of treating sawdust and the like which will meet the above requirements and will not cause any substantial agglomeration between the particles.

According to the invention sawdust and/or wood particles are treated in the presence of water at ordinary temperature, with a substance possessing fungicidal and hydrofugal properties. The treating substance is generally of bituminous or tarry character. It is used dissolved in a solvent non-miscible with water, preferably a suitable organic solvent.

In such a process, the wood particles become impregnated with water and swell considerably. The impregnating substance having fungicidal and hydrofugal (waterproofing) properties is then able to penetrate the wood particles to the core by osmotic effect, and becomes coated over the cell walls of the wood. The wood particles, thus impregnated and coated in their state of maximum expansion, retain their expanded state after drying.

The product resulting from such treatment differs profoundly in its characteristics from any that may be obtained by a nonsimultaneous action of both treatments, i.e. with water and with a waterproofing substance respectively.

As a non-restrictive example, it can be stated that, in applying the process of the invention to fresh sawdust, the sawdust may be impregnated with a volume of water substantially equal to the volume of sawdust used, and containing a bituminous substance in a proportion of about 5 to 10% by volume of the sawdust so that the bath contains a quantity of bitumen equal to 5 to 10% by volume.

For example, wood chips or cuttings or other lignocellulosic particles, or natural or artificial fibres, treated as above described, may be agglomerated by means of a bituminous binder.

Coatings produced with the novel product of the invention are not only suitable as base layers for supporting floor boards but are also usable in the construction of floor surfaces, both for indoor and outdoor use, e.g. for sports premises. In such case there may be applied thereover some suitable rigid, continuous material such as a coat of cement or prefabricated slabs such as "Fibragglo" ((agglomerated wood fibre), or slabs of asphalt and the like.

Further in the construction of floor surfaces, a base layer of sawdust treated as earlier described may be associated with a surface coating of agglomerated elements of the type just indicated. A top surface layer may desirably be provided in the form of a thin layer of liquid-cement grout, advantageously containing a suitable dye, and serving to minimize the effects of sun radiation.

The method of the invention as described is chiefly intended to retain the sawdust in a pulverulent state; it will be evident however that the process as described may be followed, if desired, by any further and conventional treatments for agglomerating the impregnated particles produced by the process, as by means of hydraulic binders for example, without exceeding the scope of the invention.

What is claimed is:

1. A method of making a flowable mass of discrete particles for a sub-floor layer, comprising the steps of preparing a bath of water and solution of a bituminous substance in a solvent therefor immiscible with water, said bituminous substance and said solvent forming a solution constituting between substantially 5 and 10% by volume of said bath; depositing discrete wood particles in said bath at substantially ambient temperature whereby said water expands the pores of said particles, thereby facilitating substantially complete penetration of said bituminous substance into said particles to produce a substantially noncoherent mass of individual particles each impregnated with said substance, the total volume of said discrete wood particles being substantially equal to that of said bath.

2. A method of making a flowable mass of discrete particles for a sub-floor layer, comprising the steps of preparing a bath of water and a solution of bituminous cut-back; depositing a quantity of wood particles equal substantially to the volume of said bath in the latter at substantially ambient temperature, said cut-back constituting between substantially 5 and 10% by volume of said particles whereby said water expands the pores of said particles, thereby facilitating substantially complete penetration of bituminous substances in said cut-back into said particles; and drying said particles.

3. A sub-floor layer consisting essentially of a flowable mass of discrete wood particles substantially completely permeated by between substantially 5 and 10% by volume of a bituminous substance.

4. A sub-floor layer consisting essentially of a flowable mass of discrete wood particles substantially completely permeated by between substantially 5 and 10% by volume of a bituminous cut-back.

References Cited in the file of this patent

UNITED STATES PATENTS

| | | |
|---|---|---|
| 93,018 | Staples | July 27, 1869 |
| 1,040,321 | Henderson | Oct. 8, 1912 |
| 1,062,686 | Amies | May 27, 1913 |
| 1,091,777 | Sprung | Mar. 31, 1914 |
| 1,226,788 | MacLeith | May 22, 1917 |
| 1,364,036 | Clark | Dec. 28, 1920 |
| 1,586,674 | Hartel | June 1, 1926 |
| 1,603,502 | Alexander | Oct. 19, 1926 |
| 1,877,508 | Hofer | Sept. 13, 1932 |
| 2,738,287 | Eisenhut | Mar. 13, 1956 |
| 2,748,012 | Helm | May 29, 1956 |
| 2,759,837 | Roberts | Aug. 21, 1956 |
| 2,888,357 | Pittman | May 26, 1959 |

FOREIGN PATENTS

| | | |
|---|---|---|
| 619,219 | Great Britain | 1949 |